Jan. 22, 1935. E. P. SEGHERS 1,988,751
HANDLE PROTECTOR
Filed March 28, 1932
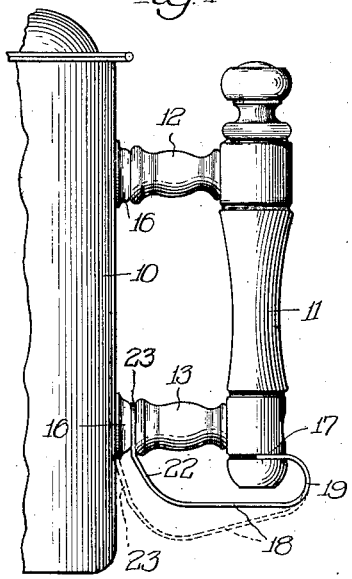
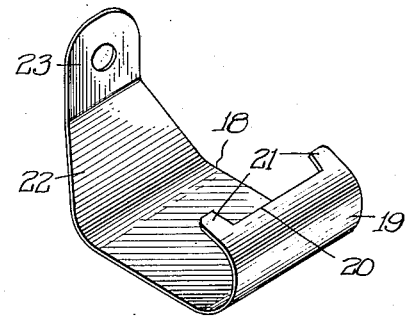
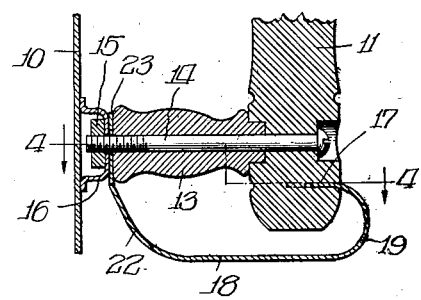
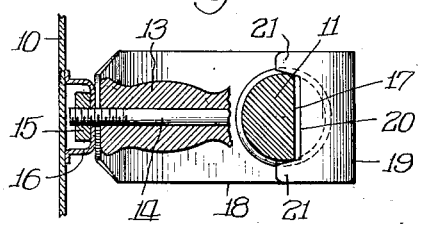
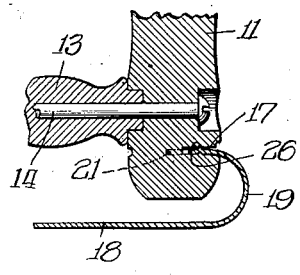
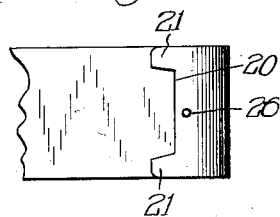
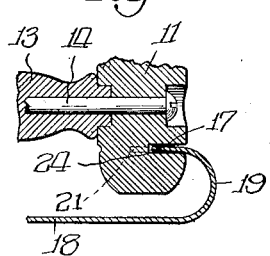
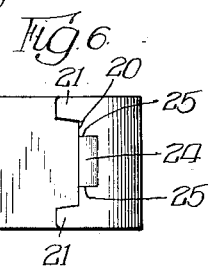
Inventor:
Emiel P. Seghers,
By Kent W. Worrell
Atty.

Patented Jan. 22, 1935

1,988,751

UNITED STATES PATENT OFFICE 1,988,751

HANDLE PROTECTOR

Emiel P. Seghers, Chicago, Ill.

Application March 28, 1932, Serial No. 601,599

15 Claims. (Cl. 53—3)

This invention relates in general to a guard for protecting the lower end of utensil handles such as coffee pots, percolators, and the like, from becoming burned or charred from a gas or other heat flame.

The principal object of the invention is in the provision of a handle protector of this kind having a portion to extend beneath the handle and with an up-turned, reversely bent, extremity to engage a suitable transverse slot or depression at the lower end of the handle.

A further object of the invention is in the provision of a guard or protector of this kind which can be made of soft or of spring metal which is positively fastened at one end and resiliently engages a holding slot in the handle at the other end for keeping the protector in place.

A still further object of the invention is in the provision of a protector having side tongues for preventing its disengagement from the handle, and with a central tongue or projection for binding it tightly in place even in a handle slot which it does not fit closely.

Other objects of the invention will appear hereinafter, the preferred constructions being illustrated in the accompanying drawing.

In the drawing, Fig. 1 is a side elevation showing this improved handle protector as applied to the handle of a percolator;

Fig. 2 is a perspective of the protector removed;

Fig. 3 is a sectional view of the protector as applied to the lower end of a handle;

Fig. 4 is a section taken on the line 4—4 of Fig. 3;

Fig. 5 is a sectional view of a modified form;

Fig. 6 is a plan view of the engaging end of the form shown in Fig. 5; and

Figs. 7 and 8 are sectional and plan views respectively of another modification.

This invention is a continuation or extension in part of my Patent No. 1,851,136, and comprises an improved or simplified connection between the protector and the handle to which it applies.

In most of the handle protectors now used for percolators and the like, the engagement or connection of the protector with the handle is so flimsy that it easily becomes loose or disconnected and is then bent or twisted in such a manner that it is no longer of any value as a heat protector for the handle. Another objection to such handle protectors is that they require a particular or specially formed handle before the protectors to be engaged therewith.

The present invention overcomes these objections by providing a protector which is first engaged with a straight cut or transverse slot at the lower end of the handle member which has substantially parallel sides and is of a width or thickness substantially equal to that of the protector metal so that the protector engages tightly when it is inserted in the slot, and then because of the slight resiliency of the material of the protector itself, the other end must be sprung in place for engagement with the fastening bolt which secures the handle to the utensil, thus yieldingly but firmly binding the guard in place.

Referring now more particularly to the drawing, this protector is commonly applied to a utensil 10 having a handle 11 usually of wood, connected at its upper and lower ends by short spacing arms 12 and 13, and secured to the utensil by bolts 14 which are inserted through the handle and through the arms and threaded into a nut 15 in a bracket or socket 16 secured to the outside of the utensil. The handles are easily attached and removed by means of the bolts 14 for renewal and repair.

In the lower end of the handle 11, a slot 17 is provided which extends transversely through approximately one-third to one-half of the thickness of the handle, the slot having substantially parallel sides and being of a thickness to loosely admit the edge of a guard or protector 18 made of light sheet metal which has some resilience.

This protector 19 has an intermediate, side, guard portion, a reversely bent or curved portion 19 adjacent one end with a straight edge 20 adapted to be inserted in the slot 17 of the handle and with lateral ears 21 at the sides of the straight portion to guide the guard into the slot and also to prevent the guard from being dislocated laterally because of the engagement of the ears with the outside edges of the slot, as more clearly shown in Fig. 4. Adjacent the other end of the guard or protector is an inclined portion 22 for diverting and deflecting the heat and for connecting the wider portion to a reduced perforated extremity 23, the perforation of which is adapted to be engaged by a fastening bolt 14 for holding the protector in place.

When this construction is applied to a handle the straight edge 20 is inserted in the handle slot 17 and the other extremity 23 will assume the position represented by the broken outline in Fig. 1 and this extremity must then be pressed toward the arm 13 to bring the perforation into position to be engaged by the fastening bolt 14. This springing action causes the opposite edge 20 to be firmly clamped or secured in the slot 17 of the handle where it usually has a firm engagement with the inner edge of the slot and from which it is not easily engaged because of the lateral ears 21.

If desired, a tongue 24 may be formed in the straight edge 20 by parallel slits 25, and the tongue may be inclined or bent in either direction for binding this edge more firmly in the slot 17 or if desired, a small tit or projection 26 may be provided in the edge of the guard or in the tongue as represented in Figs. 7 and 8, for additionally securing this end of the guard in place.

The constructions shown in Figs. 5 to 8 are particularly designed and intended for those handles in which there is considerable variation of the slots 17 due to the condition of the material at the time they are made. For example, that a slot 17 made in a green handle which is then dried may not be wide enough to receive the metal of the guard without forcing it in place and therefore the slots are usually made a little wider than the metal so that the additional binding means may be provided if desired or necessary.

In any form the outer edge of the protector is first inserted in the slot 17 and the other end is sprung into engagement with a fastening bolt 14 and locked in place thereby, which tightly secures the opposite end in the slot 17. The bearing surface of the straight end prevents the protector from being easily tilted or deflected and the projecting ears 21 prevent the protector from being laterally disengaged.

I claim:

1. The combination with a cooking utensil handle having a transverse slot with substantially parallel sides in the outer side of its lower end; of a metal protector of sheet metal having a thickness substantially equal to the thickness of the slot and an extremity adapted to engage tightly in the slot, a reversely bent portion, a guard underlying the lower handle end, and an upwardly turned perforated end; and a handle fastening screw with which the perforation of the protector end is sprung into engagement thus binding the other end in the slot.

2. The combination with a handle having a transverse slot with approximately parallel sides in its outer side adjacent the lower end, of a resilient protector extending below the lower end of the handle having one extremity turned upwardly to engage tightly in the slot and the other end adapted to be sprung and engaged by a handle fastening means to bind the first end in the slot.

3. A structure in accordance with claim 2 in which the protector extremity which engages the slot has ears at the sides projecting beyond the slot and adapted to engage the sides of the handle to limit the lateral movement of the protector.

4. A structure in accordance with claim 2 in which the protector end which engages in the slot has an independently bendable engagement tongue to make it bind and fit tightly in the slot when the protector is sprung in place.

5. A combination structure in accordance with claim 2 in which the protector end which engages in the slot has a projection in the portion inserted in the handle to engage in the slot to retain and make the said end fit tightly therein when the other end of the protector is sprung in place.

6. A percolator handle protector of thin resilient metal having a perforated extremity adapted to be engaged by a handle fastener close to the percolator, a guard portion to extend outwardly below and beyond the lower extremity of a handle and bent reversely at its other end with an extremity having a terminal straight portion to engage in a transverse slot of appreciable depth having approximately parallel sides at the lower and outer side of a handle, the protector being sprung into engagement with a handle fastener which flexes and holds the other end tightly in place in the slot.

7. A handle protector of thin sheet metal having an intermediate guard portion, a reversely bent portion adjacent one end, a straight edge substantially parallel with the guard portion at this end adapted to engage in a transverse, substantially parallel sided slot at the lower outer side of a handle, a perforation at the other end for fastening the protector in place, and the straight edge portion being provided with ears at the ends thereof which are adapted to engage the sides of a handle to which the straight edge of the protector is attached by inserting it in a slot for preventing it from moving laterally with respect to the handle.

8. A handle protector of thin metal having a straight portion at one end for engagement in a transverse slot having substantially parallel sides at the lower end of a handle, and lateral ears extending beyond and at the ends of the straight portion for preventing lateral movement of the protector when engaged in the transverse slot, and means at the perforated end for flexing the protector to retain the straight portion tightly in the said slot.

9. A percolator handle protector of thin metal having a perforated extremity at one end, an intermediate heat deflecting guard, a reversely bent portion between the guard and the other end of the protector, a straight portion at the last named end of the guard for insertion and engagement in a transverse slot having substantially parallel sides at the lower end of a handle, and a tongue in the straight portion independently bendable therefrom for tightly engaging the protector in a slot which is wider than the thickness of the metal.

10. A percolator handle protector of thin metal having a flat portion at one end adapted to be inserted in a transverse slot of a handle, said slot having substantially parallel sides, means for resiliently binding the protector with its flat extremity in said slot, and a projection from the flat portion to retain the protector in place when said projection end is sprung into said transverse slot.

11. A percolator handle protector of thin resilient metal having a perforated attaching end, an intermediate heat deflecting guard and a rounded reversely bent portion at the other end, this last named end also having a terminal flat portion substantially parallel with the guard and adapted to engage in a transverse slot having substantially parallel sides at the lower outside end of a handle, the flat portion having laterally projecting ears to engage the opposite sides of the handle at the ends of the slot therein to prevent lateral movement of the protector, and the flat portion having a bendable tongue at the edge thereof for making this extremity fit closely in a slot wider than the thickness of the metal.

12. A handle protector of thin resilient metal having an intermediate guard portion, an upwardly rounded perforated extremity, and a reversely bent portion adjacent the other extremity nearly parallel with the guard portion; said portion adapted to engage in a transverse slot having substantially parallel sides at the lower outer side of a handle and being flexed by the perforated extremity until it is substantially parallel with the guard portion when the perforated extremity is sprung and attached in place, the bent portion being thereby deflected to bind in the slot to hold the protector tightly in place at that end.

13. The combination with a cooking utensil handle having a transverse slot of appreciable depth near the lower end thereof and in the outer side thereof away from that side to be connected to the utensil, the walls of the slot being substantially parallel, of a metal protector having one edge thereof substantially the same in thickness as the width of the slot, the said edge extending into the slot a substantial amount, the said protector having a contiguous portion adjacent said edge, reversely bent over the lower end of the handle and extending into a position in proximity with that portion of the handle to be connected to the utensil and having means thereon adapted to co-operate with the handle fastening means for preventing shifting of said protector, whereby said edge of said protector cannot be moved out of said slot even on appreciable distortion thereof.

14. In a device of the class described, the combination with a handle having a transverse slot therein of appreciable depth near the lower end thereof and on the side away from the side to be connected to a utensil, said slot having substantially parallel side walls, and a metal protector having one end thereof of a thickness substantially the same as the width of the slot between the parallel walls, said end projecting into said slot a substantial amount, and a contiguous portion extending downwardly and then inwardly under the handle to a position adjacent the other side thereof and provided with means co-operating with the means for holding the handle on the utensil for preventing shifting of the protector in a direction to move said end out of said slot.

15. A device as set forth in claim 14, in which the slot engaging end of the protector is provided with ears extending beyond the slot and in position to contact with the sides of the handle to prevent sidewise shifting of said end.

EMIEL P. SEGHERS.